United States Patent
Berschback et al.

(10) Patent No.: US 10,107,302 B2
(45) Date of Patent: Oct. 23, 2018

(54) DURABLE RIBLETS FOR ENGINE ENVIRONMENT

(71) Applicant: General Electric Company, Schenectady, NY (US)

(72) Inventors: Casey Lauren Berschback, Cincinnati, OH (US); Trevor Howard Wood, Clifton Park, NY (US); Wendy Wenling Lin, Montgomery, OH (US); Lara Liou, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 598 days.

(21) Appl. No.: 14/964,722

(22) Filed: Dec. 10, 2015

(65) Prior Publication Data

US 2017/0167510 A1    Jun. 15, 2017

(51) Int. Cl.
| | |
|---|---|
| F04D 29/38 | (2006.01) |
| F02C 3/04 | (2006.01) |
| F04D 29/02 | (2006.01) |
| F04D 29/32 | (2006.01) |
| F04D 29/54 | (2006.01) |

(52) U.S. Cl.
CPC .............. *F04D 29/388* (2013.01); *F02C 3/04* (2013.01); *F04D 29/023* (2013.01); *F04D 29/325* (2013.01); *F04D 29/542* (2013.01); *F05D 2220/32* (2013.01); *F05D 2230/23* (2013.01); *F05D 2240/35* (2013.01); *F05D 2250/61* (2013.01); *F05D 2300/501* (2013.01)

(58) Field of Classification Search
CPC ..... F04D 29/023; F04D 29/388; F04D 29/542
USPC ................................. 416/235, 236
See application file for complete search history.

(56) References Cited

U.S. PATENT DOCUMENTS

| | | | |
|---|---|---|---|
| 4,706,910 A * | 11/1987 | Walsh | B64C 21/10 114/67 R |
| 4,720,239 A * | 1/1988 | Owczarek | F01D 5/141 415/119 |
| 4,986,496 A | 1/1991 | Marentic et al. | |

(Continued)

FOREIGN PATENT DOCUMENTS

| | | |
|---|---|---|
| EP | 1 065 345 A2 | 1/2001 |
| JP | 2001-516420 A | 9/2001 |
| WO | 03/104615 A1 | 12/2003 |

OTHER PUBLICATIONS

Extended European Search Report and Opinion issued in connection with corresponding EP Application No. 16201373.4 dated Apr. 4, 2017.

(Continued)

*Primary Examiner* — Timothy L Maust
(74) *Attorney, Agent, or Firm* — General Electric Company; Pamela Kachur

(57) ABSTRACT

An airfoil of a propulsion device having a first riblet laminate with a first adhesive layer on at least a first portion of the airfoil surface and a first riblet array sheet disposed on at least a portion of the first adhesive layer. The first riblet array sheet defines a first plurality of contiguous geometric features having rigid peaks and valleys extending in a first rib direction. The first plurality of contiguous geometric features define a total width to total height ratio W:H of about 1:1 to about 2.5:1 with a maximum total height of about 0.65 mm or less. A second riblet array laminate is also disclosed in an embodiment.

19 Claims, 7 Drawing Sheets

(56) References Cited

U.S. PATENT DOCUMENTS

| | | | |
|---|---|---|---|
| 5,069,403 A | 12/1991 | Marentic et al. | |
| 5,133,516 A | 7/1992 | Marentic et al. | |
| 5,337,568 A * | 8/1994 | Lee | F01D 5/18 |
| | | | 416/236 R |
| 5,386,955 A | 2/1995 | Savill | |
| 5,445,095 A | 8/1995 | Reed et al. | |
| 5,686,003 A | 11/1997 | Ingram et al. | |
| 5,848,769 A | 12/1998 | Fronek et al. | |
| 5,988,568 A | 11/1999 | Drews | |
| 6,183,197 B1 * | 2/2001 | Bunker | F01D 5/141 |
| | | | 415/178 |
| 6,203,021 B1 * | 3/2001 | Wolfla | C23C 4/18 |
| | | | 277/415 |
| 6,345,791 B1 | 2/2002 | McClure | |
| 6,589,600 B1 * | 7/2003 | Hasz | B22C 9/10 |
| | | | 427/264 |
| 6,994,045 B2 | 2/2006 | Paszkowski | |
| 7,041,363 B2 | 5/2006 | Krohmer et al. | |
| 7,070,850 B2 | 7/2006 | Dietz et al. | |
| 7,334,997 B2 | 2/2008 | Karafillis | |
| 7,510,370 B2 | 3/2009 | Strangman et al. | |
| 7,909,576 B1 * | 3/2011 | van der Bos | F03D 1/0675 |
| | | | 416/146 R |
| 8,216,689 B2 | 7/2012 | Witz et al. | |
| 8,220,754 B2 | 7/2012 | McClure et al. | |
| 8,413,928 B2 | 4/2013 | Rawlings et al. | |
| 8,469,313 B2 | 6/2013 | Dong | |
| 8,578,747 B2 | 11/2013 | Li et al. | |
| 8,668,166 B2 | 3/2014 | Rawlings et al. | |
| 8,876,052 B2 | 11/2014 | Rawlings et al. | |
| 9,581,133 B2 * | 2/2017 | Yao | F03D 1/0608 |
| 2005/0163621 A1 | 7/2005 | Mills et al. | |
| 2007/0194178 A1 | 8/2007 | Lang | |
| 2008/0061192 A1 | 3/2008 | Sullivan | |
| 2010/0108813 A1 | 5/2010 | Lang | |
| 2010/0127125 A1 | 5/2010 | Li et al. | |
| 2010/0264665 A1 | 10/2010 | Hebert | |
| 2010/0282909 A1 | 11/2010 | Rawlings et al. | |
| 2011/0186685 A1 | 8/2011 | Tsotsis et al. | |
| 2013/0146217 A1 | 6/2013 | Kray et al. | |
| 2013/0156595 A1 | 6/2013 | Sander et al. | |
| 2013/0236322 A1 | 9/2013 | Schmidt et al. | |
| 2013/0323070 A1 * | 12/2013 | Grabau | F03D 1/0675 |
| | | | 416/229 R |
| 2014/0130318 A1 | 5/2014 | Rohr et al. | |
| 2014/0272237 A1 | 9/2014 | Roper et al. | |
| 2014/0356219 A1 | 12/2014 | Gammel et al. | |
| 2015/0053289 A1 | 2/2015 | Kurtovic et al. | |
| 2016/0076552 A1 * | 3/2016 | Anderson | B29C 70/382 |
| | | | 416/230 |
| 2017/0167510 A1 * | 6/2017 | Berschback | F04D 29/388 |

OTHER PUBLICATIONS

Dean, Brian Douglas, "The Effect of Shark Skin Inspired Riblet Geometric on Drag in Rectangular Duct Flow." The Ohio State University, 2011.

Walsh, Michael J., "Riblets for Aircraft Skin-Friction Reduction," NASA Langley Research Center, Hampton, Virginia, 557-571.

Buttner, Claudia Christine, "Shark Skin Inspired Surfaces for Aerodynamically Optimized High Temperature Application—Fabrication, Oxidation, Characterization," Rhineland—Westphalian Technical University, oral examination: May 25, 2011.

Machine Translation and Notification of Reasons for Refusal issued in connection with corresponding JP Application No. 2016-230835 dated Dec. 26, 2017.

* cited by examiner

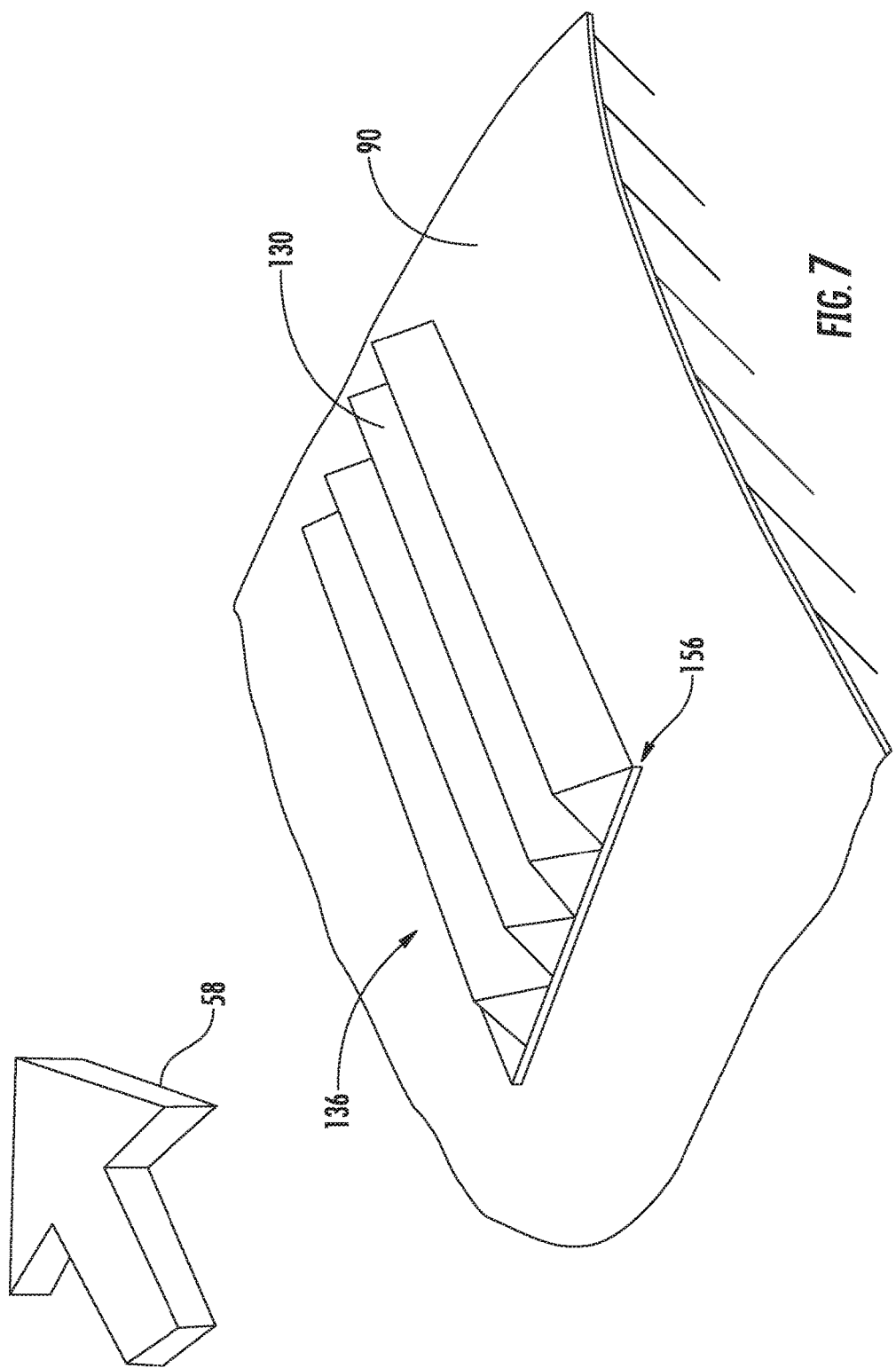

DURABLE RIBLETS FOR ENGINE ENVIRONMENT

FIELD OF THE INVENTION

The present subject matter relates generally to structures having modified surfaces and, more particularly, to modified engine surfaces, such as airfoils, with riblet array laminates that are subject to erosive conditions.

BACKGROUND OF THE INVENTION

Surfaces of aircraft (body, wing, nacelle, and engine), power generation structures (e.g. wind and land based turbines, gas turbines, etc.) or other structures may be subject to environmental erosion conditions that can degrade the performance and/or durability of the structure. These surfaces can be modified to contain geometric features such as riblets for aerodynamic performance enhancement, moisture/ice accumulation prevention, erosion protection, and other reasons.

Aerodynamic performance of symmetrical two-dimensional (2D) riblets with sawtooth, scalloped, and blade cross sections has been extensively studied. Alternative riblet geometries including asymmetrical riblets, hierarchical riblets, and riblets with rounded or notched peaks, have in general, shown no increased benefit. Other 2D riblet shapes studied include alternating brother-sister type riblets and hierarchical riblets with small riblets on top of larger riblets. These studies were largely limited to aerodynamic parameters and failed to consider the effect of erosive field conditions on riblet performance.

To address erosion, a surface may include a hard coating. However, a challenge exists in the design of surfaces that are subject to various erosion conditions since coatings that provide aerodynamic or anti-icing properties may not provide erosion (both rain and grit) protection and, vice-versa, coatings that provide erosion protection may not provide aerodynamic or anti-icing properties.

It is highly desirable to provide a modified surface, such as an airfoil, with a durable riblet array laminate that both withstands erosive conditions and maintains its aerodynamic/anti-icing properties.

BRIEF DESCRIPTION OF THE INVENTION

Aspects and advantages of the invention will be set forth in part in the following description, or may be obvious from the description, or may be learned through practice of the invention.

An airfoil is generally provided for a propulsion device. In one embodiment, the airfoil defines a leading edge, a trailing edge, and an airfoil surface extending between the leading edge and the trailing edge with the airfoil having a first riblet array laminate on the airfoil surface. The first riblet laminate has a first adhesive layer on at least a first portion of the airfoil surface and a first riblet array sheet disposed on at least a portion of the first adhesive layer. The first riblet array sheet defines a first plurality of contiguous geometric features having rigid peaks and valleys extending in a first rib direction. The first plurality of contiguous geometric features define a total width to total height ratio W:H of about 1:1 to about 2.5:1 with a maximum total height of about 0.65 mm or less. The first plurality of continuous geometric features can be the same size through the sheet, or may vary in size through the first riblet array sheet within such parameters.

A gas turbine engine is also generally disclosed with a fan section having at least one fan blade, blisk, outlet guide vane, or mixtures thereof, a compressor, a combustor disposed downstream from the compressor, and a turbine disposed downstream from the combustor. The engine has at least one airfoil defining a leading edge, a trailing edge, and an airfoil surface extending between the leading edge and the trailing edge. The airfoil has a first riblet array laminate having a first adhesive layer on at least a first portion of the airfoil surface and a first riblet array sheet disposed on at least a portion of the first adhesive layer. The first riblet array sheet defines a first plurality of contiguous geometric features having rigid peaks and valleys extending in a first rib direction. The first plurality of contiguous geometric features define a total width to total height ratio W:H of about 1:1 to about 2.5:1 with a maximum total height of about 0.65 mm or less. Also, a second riblet array laminate having a second adhesive layer is disposed on at least a second portion of the airfoil surface with a second riblet array sheet being disposed on at least a portion of the second adhesive layer. The second riblet array sheet defines a second plurality of contiguous geometric features having rigid peaks and valleys extending in a second rib direction. The second plurality of contiguous geometric features define a total width to total height ratio W:H of about 1:1 to about 2.5:1 with a maximum total height of about 0.65 mm or less. The second rib direction is different than the first rib direction. The second plurality of continuous geometric features can be the same size through the sheet, or may vary in size through the second riblet array sheet within such parameters. Additionally, the continuous geometric features can have a size on the second riblet array sheet that is independent of their size on the first riblet array sheet.

Methods are also generally provided for providing erosion protection to an airfoil. In one embodiment, the method can include adhering a first riblet array laminate to the airfoil, the first riblet array laminate having a first adhesive layer on at least a first portion of the airfoil surface, and a first riblet array sheet disposed on at least a portion of the first adhesive layer, wherein the first riblet array sheet defines a first plurality of contiguous geometric features having rigid peaks and valleys extending in a first rib direction, and wherein the first plurality of contiguous geometric features define a total width to total height ratio W:H of about 1:1 to about 2.5:1 with a maximum total height of about 0.65 mm or less, then adhering a second riblet array laminate to the airfoil, the second riblet array laminate having a second adhesive layer on at least a second portion of the airfoil surface, and a second riblet array sheet disposed on at least a portion of the second adhesive layer, wherein the second riblet array sheet defines a second plurality of contiguous geometric features having rigid peaks and valleys extending in a second rib direction that is different from the first rib direction, and wherein the second plurality of contiguous geometric features define a total width to total height ratio W:H of about 1:1 to about 2.5:1 with a maximum total height of about 0.65 mm or less.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 is a perspective of a riblet array laminate disposed on an airfoil surface of an engine body.

DETAILED DESCRIPTION OF THE INVENTION

Figure 1:
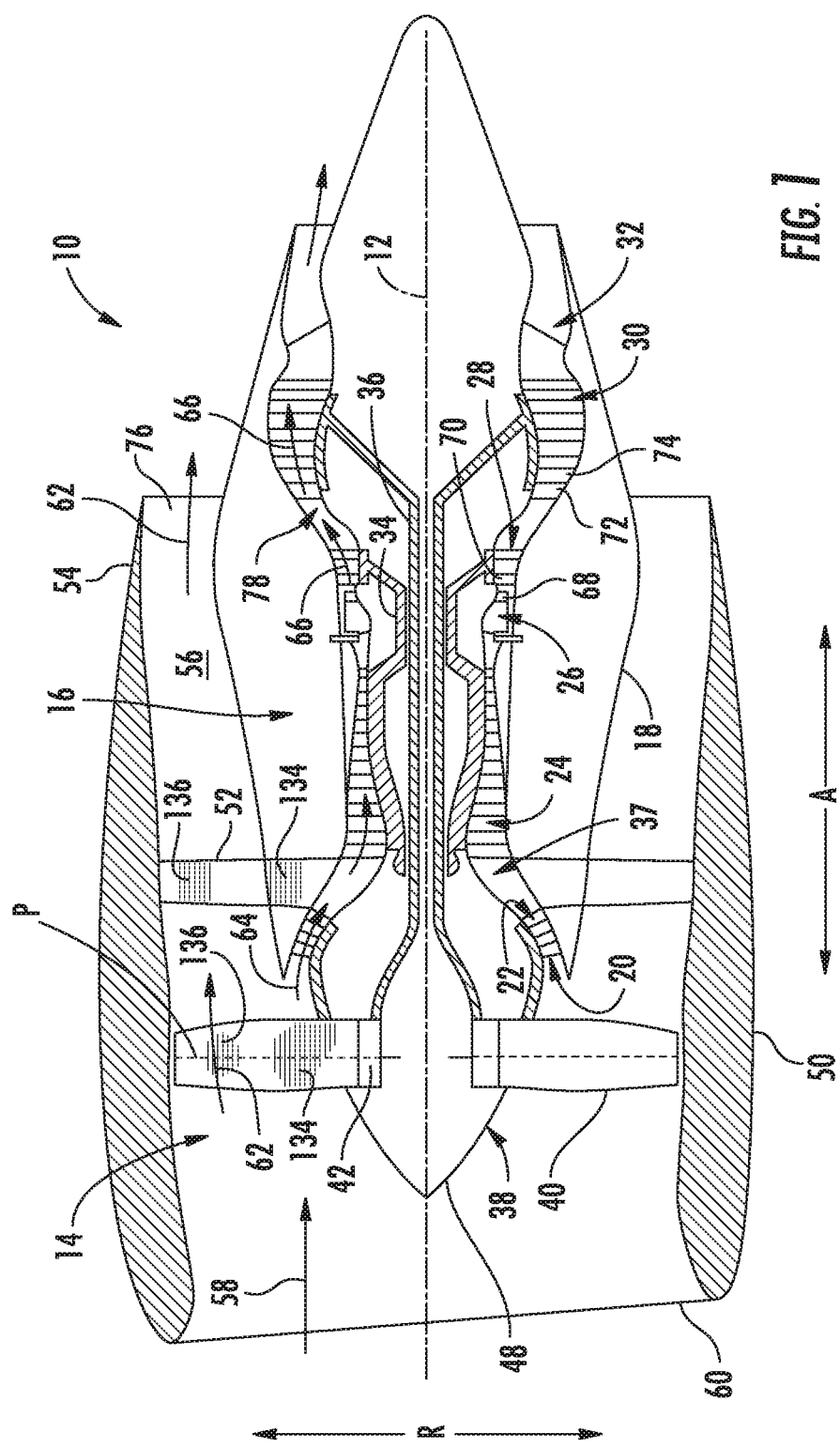
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the term 'laminate' is defined as a laminated structure or material, especially one made of layers fixed together to form a hard, flat, or flexible material.

Riblet array laminates improve aerodynamic performance on jet engine surfaces (e.g., airfoil surfaces, nacelle structures, guide vanes, etc.). However, compared to a smooth airfoil surface, a riblet array laminate surface can be less durable in a harsh engine environment exposed to rain erosion and grit erosion. In engines, riblet array laminates can be applied to airfoils, including but not limited to fan blades, fan outlet guide vanes (OGV), propellers, and other aerodynamic structures in the fan section where there is high flow and harsh environment, which is more severe than around aircraft body and wing due to air flow acceleration from fan. In a harsh jet engine environment, rain erosion testing, grit erosion testing, and spin rig testing has shown that the riblet size range and configuration herein presents a riblet array laminate that is more erosion resistant than the airfoil surface that the riblet array laminate is attached to.

In one embodiment, the contiguous geometric features on the riblet array sheets have sharp peaks (top of riblet) and valleys (bottom of riblets), with a total width (peak-to-peak distance) to total height ratio W:H of about 1:1 to about 2.5:1 (e.g., about 1.25:1 to about 2.25:1) with a maximum total height of about 0.65 mm or less (e.g., about 0.55 mm or less). The optimal size of the riblets was determined by durability testing of rain erosion and grit erosion. The erosion test parameters are meant to simulate the aggressive environment of a jet engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal centerline 12 provided for reference), a radial direction R, and a circumferential direction C (see FIG. 3). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a fan 38, also referred to as a blisk 38, having a plurality of fan blades 40 coupled to a rotor disk 42, in a spaced apart manner. As depicted, the fan blades 40 extend outwardly from rotor disk 42 generally along the radial direction R. At least one riblet array laminate 134, 136 is attached to the pressure sides of the fan blades 40 or blisk 38. The disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan or blisk 38 and/or at least a portion of the core turbine engine 16. It should be appreciated that the nacelle 50 may be configured to be supported relative to the core 16 by a plurality of circumferentially-spaced outlet guide vanes 52. At least one riblet array laminate 134, 136 is attached to the pressure side of the outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40 or blisk, a first portion of the air 58 as indicated by arrows 62 is directed or routed over a first riblet array laminate 136 into the bypass airflow passage 56 and a second portion of the air 58 as indicated by arrow 64 is directed or routed over a second riblet array laminate 134 into the core air flowpath 37, or more specifically into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan or blisk 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan or blisk 38 nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan or blisk 38 may be configured as a variable pitch fan including, e.g., a suitable actuation assembly for rotating the plurality of fan blades about respective pitch axes P. It should also be appreciated, that in still other exemplary embodiments, aspects of the present disclosure may be incorporated into any other suitable gas turbine engine. For example, in other exemplary embodiments, aspects of the present disclosure may be incorporated into, e.g., turboprop engine.

Figure 2:
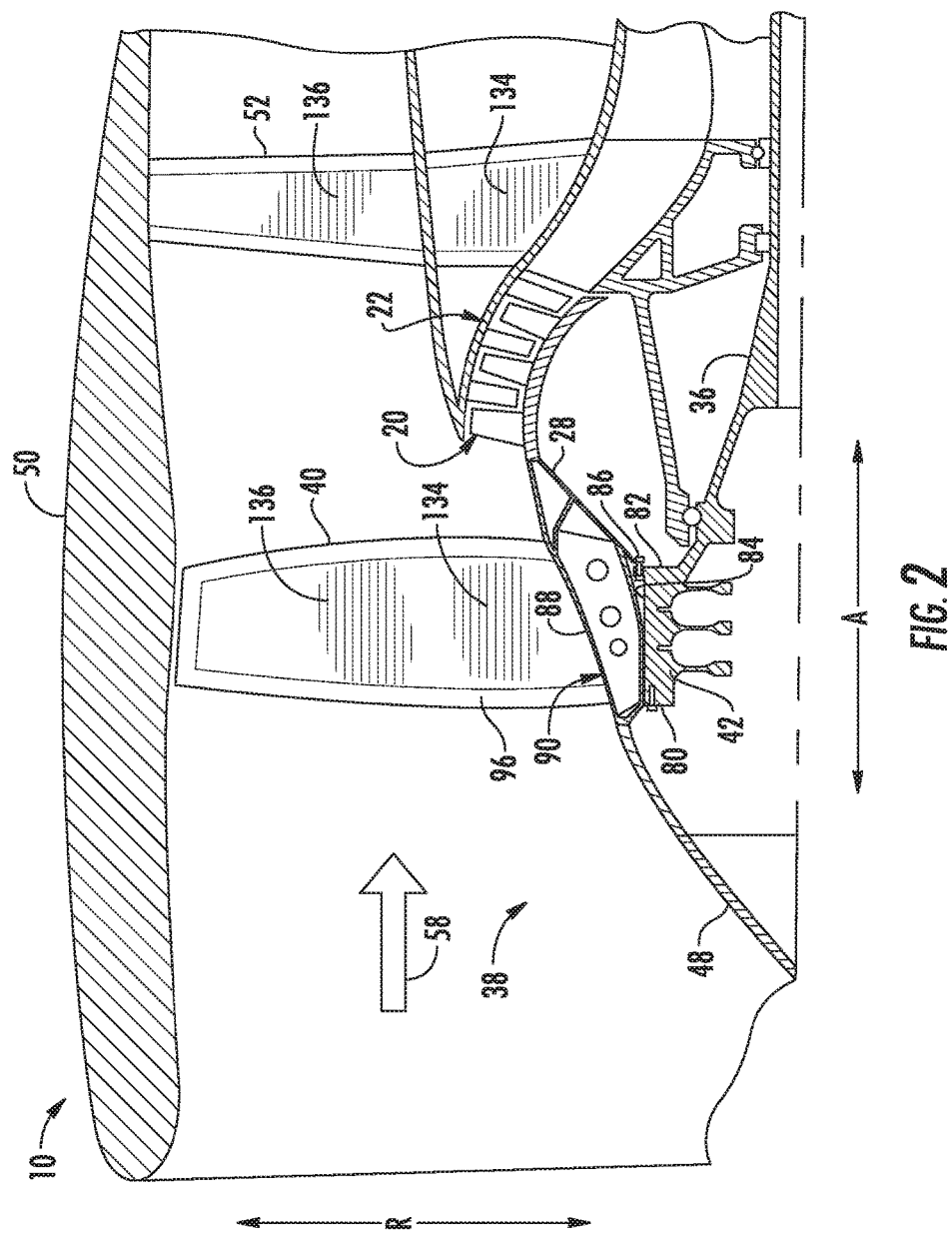
FIG. 2 is a schematic, cross-sectional view of a forward end of the exemplary gas turbine engine of FIG. 1.

Referring now to FIG. 2, a close-up, schematic view is provided of the exemplary turbofan engine 10 of FIG. 1. As shown, the fan or blisk 38 includes the rotor disk 42 and the plurality of circumferentially spaced fan blades 40 (only one shown in FIG. 2) extending radially outwardly from the rotor disk 42. At least one first and second riblet array laminate 134,136 is positioned on the pressure side 96 of the fan blade 40. Also, at least one first and second riblet array laminate 134,136 is positioned on the outlet guide vanes 52. The rotor disk 42 includes axially spaced apart forward and aft sides 80 and 82, respectively, and a radially outer surface 84 extending therebetween.

For the embodiment depicted, the LP shaft 36 is suitably fixedly joined directly to the rotor disk aft side 82 by a plurality of bolts 86. However, in other exemplary embodiments, the turbofan engine 10 may include a geared fan configuration, such that a gearbox is disposed between the LP shaft 36 and the fan or blisk 38. For example, in such an exemplary embodiment, the LP shaft 36 may be fixedly joined to an input shaft, the input shaft coupled to the gearbox, and the gearbox also mechanically coupled to a fan shaft for driving the fan or blisk 38.

Figure 3:
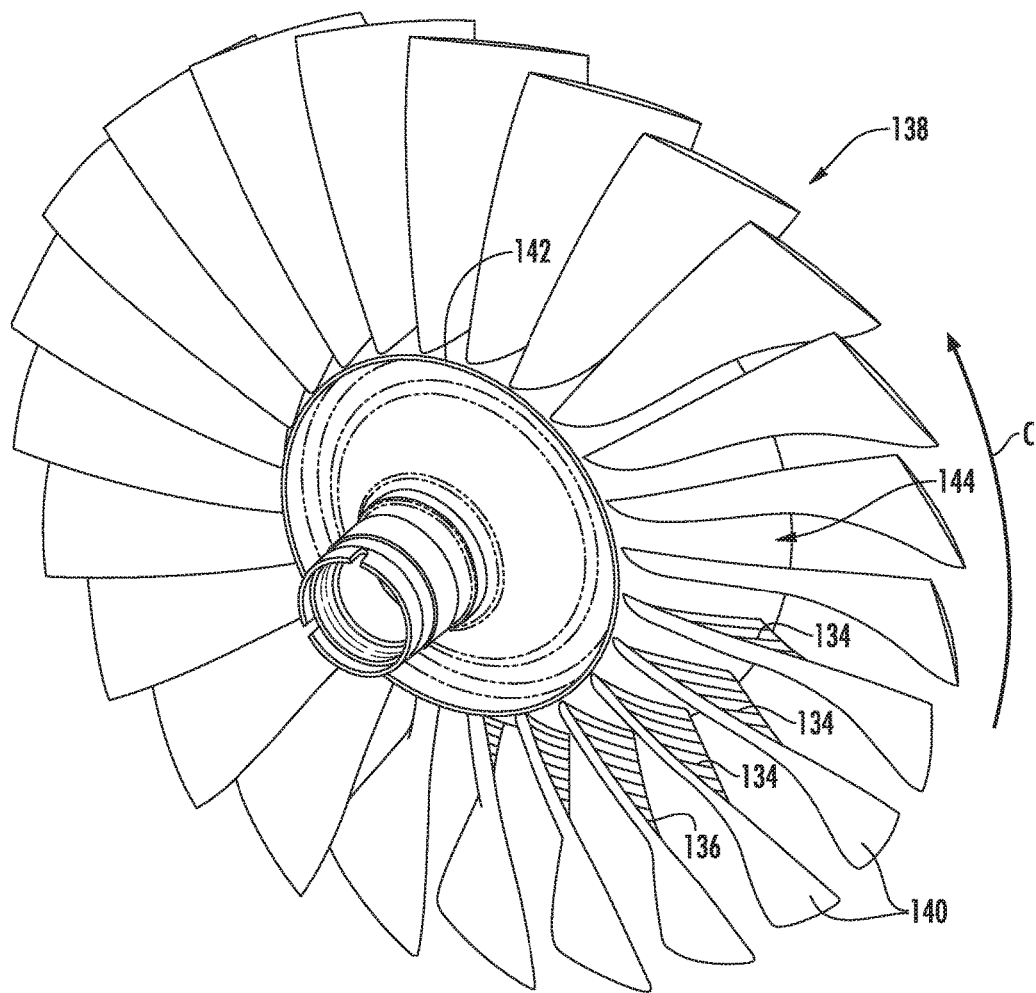
FIG. 3 is a perspective view of a fan blisk with a riblet array constructed in accordance with the present invention.

FIG. 3 depicts an exemplary fan blisk 138 constructed in accordance with the present invention, having a metallic rotor disk 142 with an annular flowpath surface 144, and a plurality of airfoil-shaped blades 140 attached thereto. As used herein, the term "blisk" is used to refer to any gas turbine engine component which includes a hub having blades integral therewith. Such components are sometimes referred to as "bladed disks" or "integrally bladed rotors". The present invention is especially useful for blisks used as low-pressure fans on aircraft gas turbine engines, but is applicable to any kind of blisk structure. As used herein, the term "integral" refers to two components which effectively form a single member without a mechanical discontinuity therebetween, whether the components originated separately or from a single workpiece.

Figure 4:
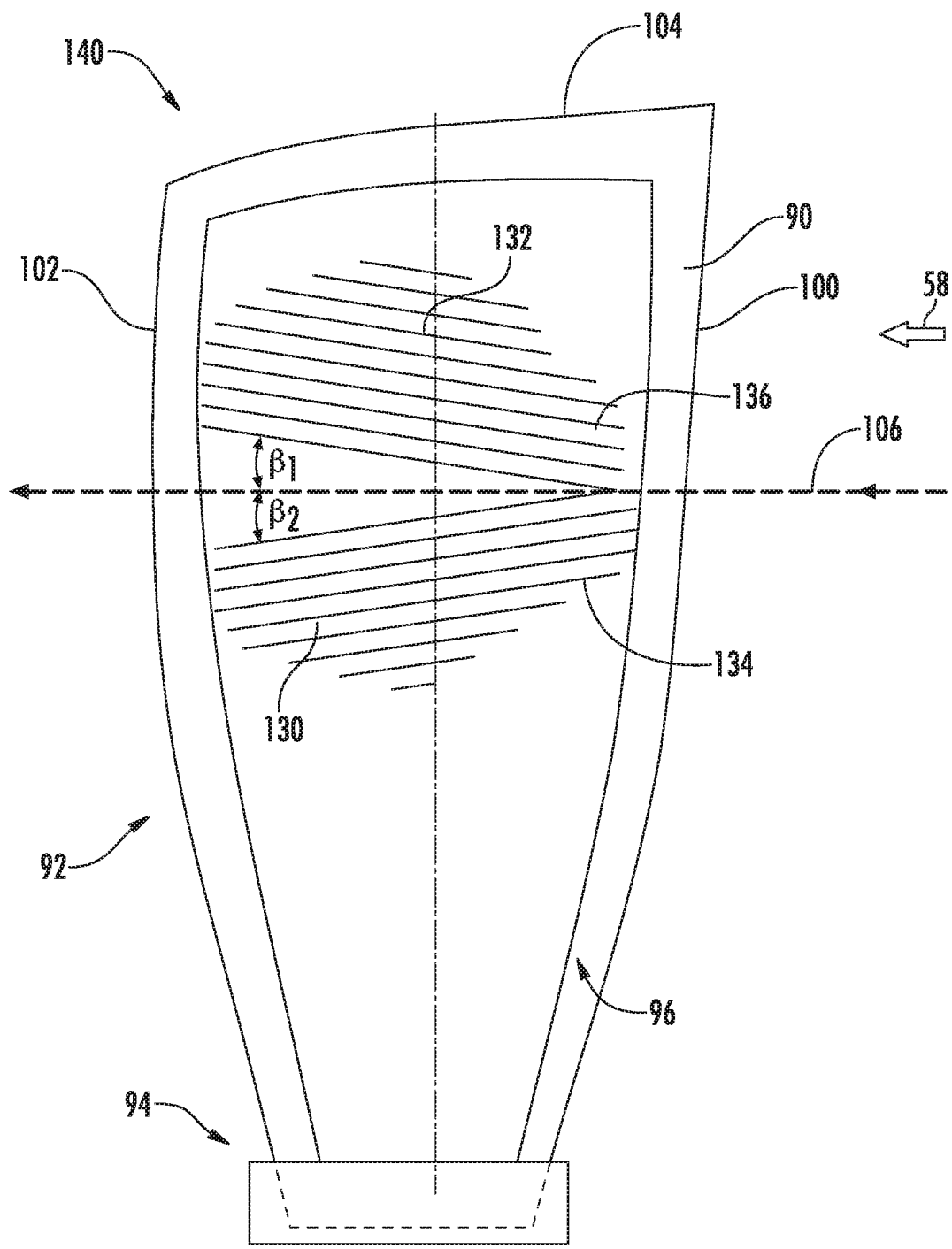
FIG. 4 is a side view of one of the fan blades of the blisk of FIG. 3.
Figure 5:
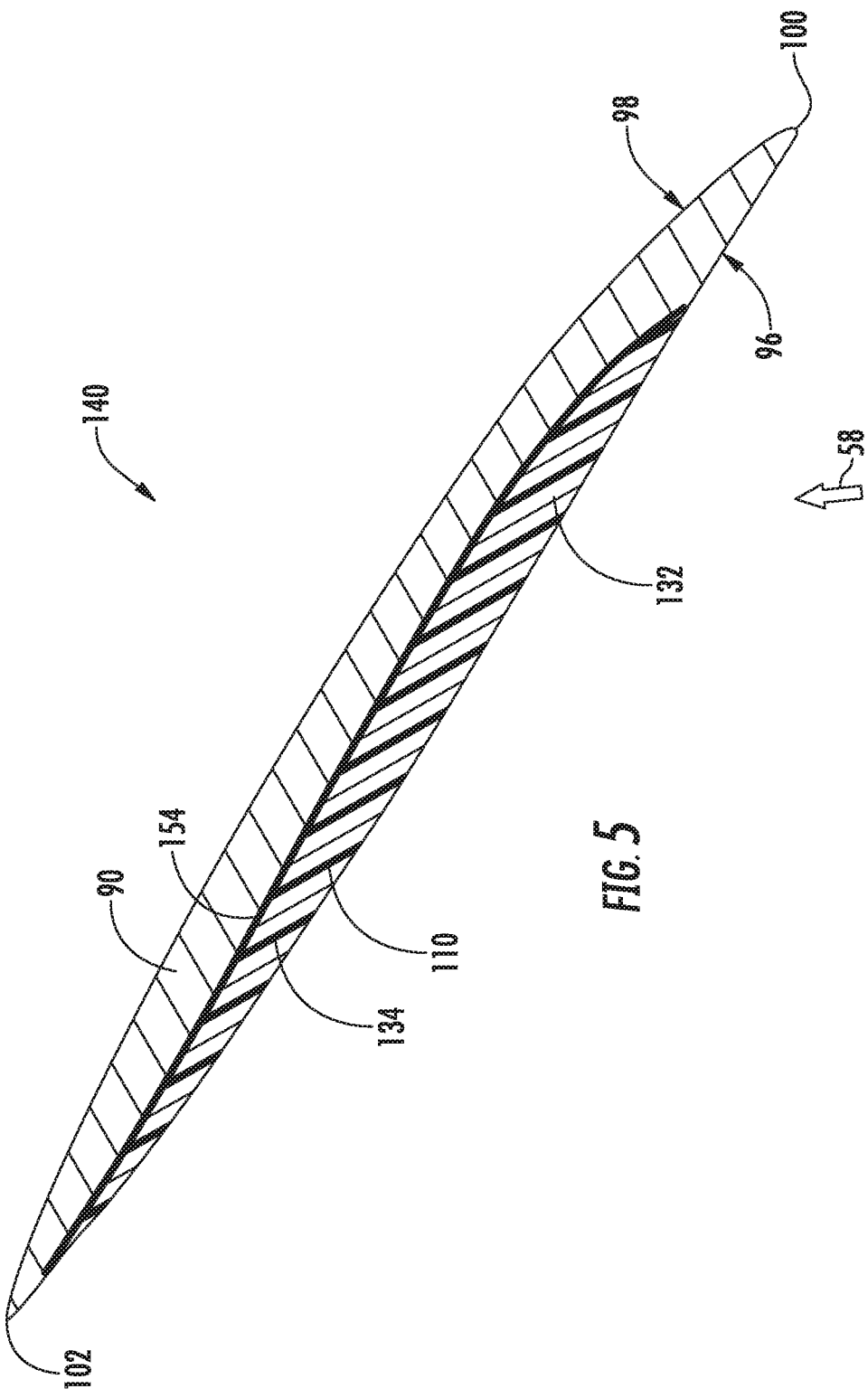
FIG. 5 is a section of a fan blade of FIG. 4 cut along the axial direction A.

FIGS. 4 and 5 illustrate an exemplary blade 140 in more detail. The blade 140 includes a body 90 which defines an airfoil portion 92 and a shank portion 94. The airfoil portion 92 includes opposed pressure sides 96 and suction sides 98, a leading edge 100, a trailing edge 102, and a tip 104. The body 90 can be constructed from a metal alloy formed to the desired shape, that will withstand the necessary operating loads, and which is compatible with the hub material. Examples of suitable alloys include, but are not limited to, titanium, aluminum, cobalt, nickel, or steel-based alloys. The body 90 and the hub 142 (see FIG. 3) may be formed by machining their respective contours from a single blank of material in a known manner. At least one first and second riblet array sheet 130,132 is attached to the airfoil surface of body 90 with an adhesive layer 154, 156 to form the first and second riblet array laminates 134, 136. The number and location of the first and second riblet array laminates 134, 136 may be varied to suit a particular application. In the illustrated example of FIG. 4, the airfoil surface of body 90 includes a first riblet array laminate 136 and second riblet array laminate 134 on the pressure side 96 of the airfoil portion 92. Each riblet array laminate 134,136 is oriented such that the riblet peaks 146 and riblet valleys 148 run generally parallel, within a yaw angle β1 and β2 with respect to a tangent line 106 extending from the leading edge of the airfoil in the axial direction of the gas turbine engine. The yaw angle β1 or β2 can be in a range of about 45 degrees from parallel with the tangent line 106 in either direction (e.g., about 2 degrees to about 35 degrees from parallel, such as about 5 degrees to about 15 degrees from parallel). The riblet array sheets 130,132 may be made of any material which will withstand the expected air loads and temperatures during operation and which can be formed to the desired profile. The riblet array laminates 134,136 may or may not contribute to the overall structural integrity of the blade 140.

The riblet array sheet 130,132 material is less dense than the body 90, so as to minimize the additional mass of the blade 140. Examples of suitable materials include composites such as carbon fiber filaments embedded in an epoxy resin binder, referred to as a "carbon-epoxy" system, fiber-bismaleimide, fiber-polyimide, and other fiber-epoxy thermoset or thermoplastic resins and mixtures thereof. Other suitable materials include elastomers, rigid foams (e.g. a polymer, ceramic, polyurethane, silicone, or metal, or a mixture thereof having cellular structures dispersed throughout the material), structural foams (i.e. a plastic having a cellular core and integral skin), and syntactic foams (i.e. a cellular polymer made by dispersing rigid, microscopic particles in a fluid polymer and then curing it). The first and second riblet array sheets 130,132 may be formed and then secured to the blade 140 with a first and second adhesive layer 154,156 or fasteners so as to bond directly thereto.

FIG. 5 illustrates a perspective, expanded view of a portion of the body 90. The airfoil surface of body 90 is modified to include at least one first riblet array laminate 134 having a plurality of contiguous geometric features 110 that generally extend or project from the riblet array sheet 132 that is adhered to the airfoil surface of body 90 with a first adhesive layer 154. Further surface treatments or coating may optionally be applied to the contiguous geometric features 110. In the FIG. 6 example, the contiguous geometric features 110 are a sawtooth profile, although it is to be understood that other contiguous geometric shapes may alternatively be used.

Figure 6:
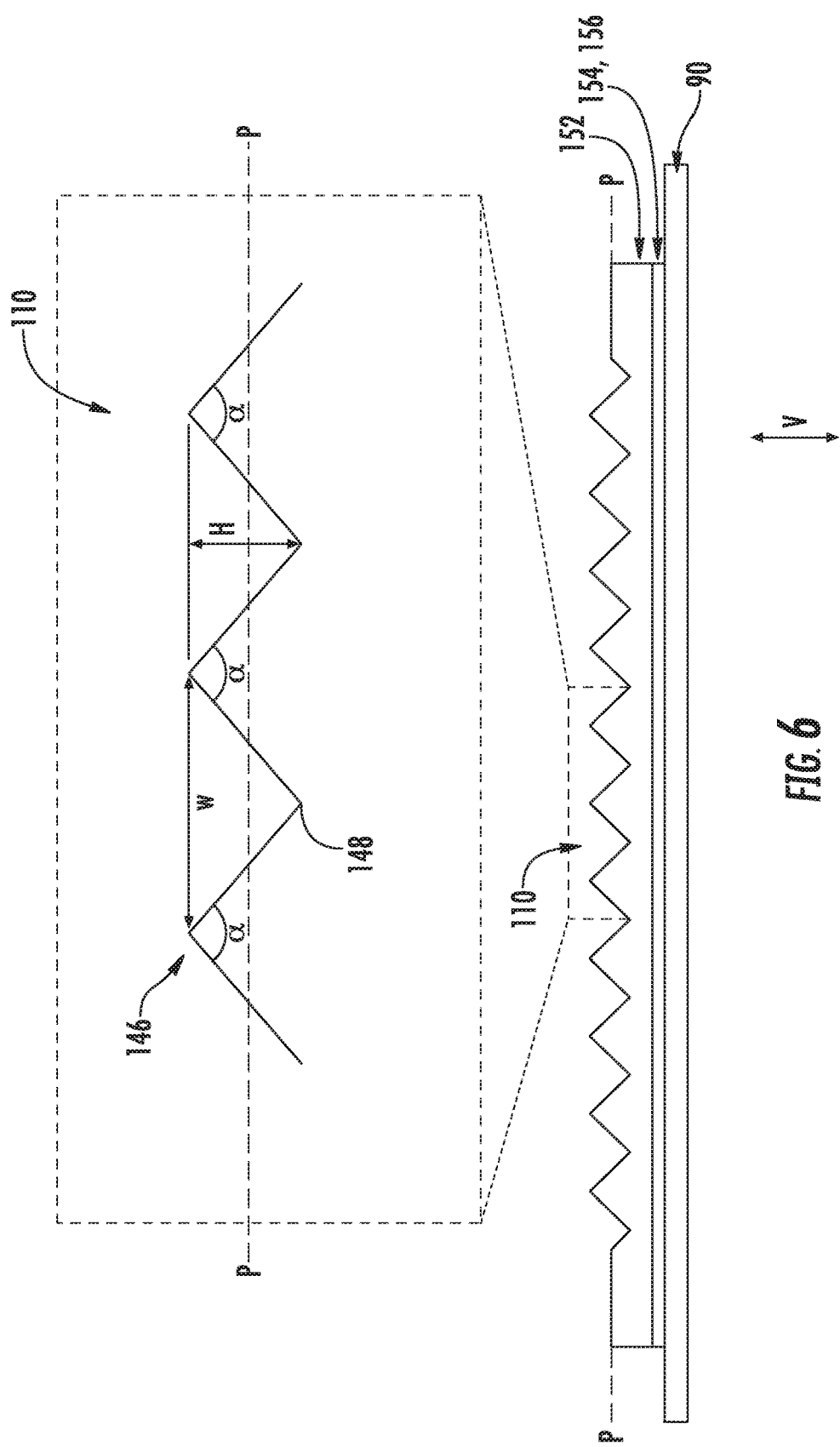
FIG. 6 is a section of a riblet array laminate showing exemplary contiguous geometric features.

As shown in FIG. 6, plane P extends generally parallel to the airfoil portion 92 of the body 90 and through each of the contiguous geometric features 110. The airfoil surface of body 90 has a first erosion resistance that is generally defined by the material and processing history of the body 90. The plurality of contiguous geometric features 110 found in the first and second riblet array sheets 130,132 has a second, greater erosion resistance with regard to the first erosion resistance of the airfoil surface of body 90. The second erosion resistance is defined by the material of the contiguous geometric features 110 and the processing technique by which the contiguous geometric features 110 are attached to the airfoil surface of body 90. As an example, the airfoil surface of body 90 is made of a polymer material, a metallic material, a ceramic material, or combinations thereof, such as composites. The contiguous geometric features 110 are made of another polymer material, a ceramic material, an intermetallic material, a metallic material, or combinations thereof, such as composites. In a further example, the airfoil surface of body 90 is a metallic material and the contiguous geometric features 110 are a metallic material, such as an essentially pure material or an alloy, based on tungsten, nickel, tantalum, niobium, titanium or iron. In a further example, the airfoil surface of body 90 and the plurality of contiguous geometric features 110 are made of respective materials that have equivalent material composition, such as an equivalent metallic alloy composition and the difference between the first erosion resistance and the second erosion resistance is due to processing.

The second, or greater erosion resistance of the contiguous geometric features 110 corresponds to an erosion rate of the first and second riblet array laminates 134,136 that is less than the erosion rate of the airfoil surface of body 90 under identical erosion conditions. An illustrative, but non-limiting example of an experimental erosion condition is to deliver controlled grit erosion matter to challenge each surface, the airfoil surface of body 90 and the first and second riblet array laminates 134,136, at rates ranging from about 50 grams to about 700 grams of total erodent. The riblet erosion ratio of total challenge erodent mass (grams) to first and second riblet array laminates 134,136 mass loss (grams) is indicative of the second erosion resistance, or first and second riblet array laminates 134,136 erosion resistance. The erosion ratio of total challenge erodent to mass loss for the first and second riblet array laminates 134,136 was in the range of about 20,000 to 27,000 grams/grams. The airfoil surface of body 90 erosion ratio of total challenge erodent (grams) to airfoil surface of body 90 mass loss (grams) is indicative of the first erosion resistance, or airfoil surface of body 90 erosion resistance. The airfoil surface of body 90 erosion ratio of total challenge erodent (grams) to mass loss (grams) for the airfoil surface of body 90 was in the range of about 27,000 to 35,000 grams/grams. However, in all experimental conditions of total challenge erodent rates, the erosion ratio for the riblet array surfaces was less than the erosion ratio for the airfoil surface of body 90 thereby establishing that the first and second riblet array laminates 134,136 (second) erosion resistance is greater than or equal to the airfoil surface of body 90 (first) erosion resistance because the experimental erosion rate for the first and second riblet array laminates 134,136 was less than the experimental erosion rate of the airfoil surface of body 90.

FIG. 6 illustrates a cross-section of an exemplary first or second riblet array laminate 134,136 with representative first or second plurality of contiguous geometric features 110. The first or second riblet array laminate 134,136 extends in the axial direction A, also in the direction of plane P, and a vertical direction V defined between the airfoil surface of body 90 and a riblet peak 146. The riblet base 152 defines a reference plane that is generally parallel to the airfoil surface of body 90. The first or second contiguous geometric features 110 define a height (H) between the riblet valley 148 and riblet peak 146 along a direction generally perpendicular to plane P and a maximum width (W) between riblet peaks 146 along a direction generally parallel to plane P. The maximum height (H) and the maximum width (W) define an aspect ratio W:H for each of the first or second contiguous geometric features 110. In one example, the aspect ratio W:H of about 1:1 to about 2.5:1 (e.g., about 1.25:1 to about 2.25:1) with a maximum total height of about 0.65 mm or less (e.g., about 0.55 mm or less, such as about 0.4 mm or less). In another example, the first or second plurality of contiguous geometric features have rigid peaks and valleys extending in the first or second rib direction having a yaw angle β1, β2 that is different than each other (e.g., each are oriented within about 45 degrees of a tangent direction extending from the lead edge of the airfoil). In another example, the first or second plurality of contiguous geometric features have rigid peaks and valleys extending in the first and second rib direction having a yaw angle β1, β2 within about 20 degrees of axial direction A of the gas turbine engine.

For example, a contiguous geometric feature aspect ratio (W:H) of about 1.5:1 to about 2.5:1 defines a peak angle α between the legs of the first or second contiguous geometric features 110 of about 75 degrees to about 105 degrees. The first riblet array laminate 136 and second riblet array laminate 134 can extend from the trailing edge 102 to the leading edge 100 of the airfoil to cover about 75% to about 99% of the airfoil 92 surface in the engine axial direction A therebetween. The leading edge 100 of the airfoil 92 can be substantially smooth surface. The first riblet array sheet 130 and the second riblet array sheet 132 can be formed from an elastomeric material.

FIG. 7 is a perspective of an exemplary sawtooth pattern first riblet array laminate 136 attached to a airfoil surface of body 90 showing the general airflow 58 direction relative to the first riblet array laminate 136 position. The first riblet array sheet 130 is adhered to the airfoil surface of body 90 by the first adhesive layer 156.

A method of providing erosion protection to an airfoil involves the steps of; adhering a first riblet array laminate to the airfoil, the first riblet array laminate having a first adhesive layer on at least a first portion of the airfoil surface and a first riblet array sheet disposed on at least a portion of the first adhesive layer. The first riblet array sheet defines a first plurality of contiguous geometric features having rigid peaks and valleys extending in a first rib direction having a yaw angle β1 within about 45 degrees of a tangent direction extending from the lead edge of the airfoil. The first plurality of contiguous geometric features define a total width to total height ratio W:H of about 1.5:1 to about 2.5:1 with a maximum total width of about 0.65 mm or less.

The next step is adhering a second riblet array laminate to the airfoil, the second riblet array laminate having a second adhesive layer on at least a second portion of the airfoil surface and a second riblet array sheet disposed on at least a portion of the second adhesive layer. The second riblet array sheet defines a second plurality of contiguous geometric features having rigid peaks and valleys extending in a second rib direction that is different from the first rib direction. The second plurality of contiguous geometric features have a yaw angle β2 within about 45 degrees of a tangent direction extending from the lead edge of the airfoil. The second plurality of contiguous geometric features define a total width to total height ratio W:H of about 1.5:1 to about 2.5:1 with a maximum total width of about 0.65 mm or less. The first riblet array laminate and second riblet array laminate exhibit a second erosion resistance that is greater than or equal to a first erosion resistance of the airfoil surface, thereby providing erosion protection for the airfoil.

In one particular embodiment, multiple riblet sheets (e.g., a first riblet sheet, a second riblet sheet, etc.) are positioned adjacent to each such that a seam is formed between adjacent riblet sheet sides extending the erosion film forming a joint. Next, a thin strip of the erosion material may be applied over the joint to prevent adhesive from seeping through the joint. An adhesive can then be applied to the back surface (e.g., to the entire, full surface) of the multiple sheets, and optionally a vacuum can be applied to debulk the adhesive layer. The adhesive coated riblet sheet assembly can then be adhered to the substrate surface.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil defining a leading edge, a trailing edge, and an airfoil surface extending between the leading edge and the trailing edge, the airfoil comprising a first riblet array laminate on the airfoil surface, the first riblet laminate comprising:
    a first adhesive layer on at least a first portion of the airfoil surface;
    a first riblet array sheet disposed on at least a portion of the first adhesive layer, wherein the first riblet array sheet defines a first plurality of contiguous geometric features having peaks and valleys extending in a first rib direction, and wherein the first plurality of contiguous geometric features define a total width to total height ratio W:H of about 1:1 to about 2.5:1; and
    further comprising a second riblet array laminate comprising:
    a second adhesive layer on at least a second portion of the airfoil surface;
    a second riblet array sheet disposed on at least a portion of the second adhesive layer, wherein the second riblet array sheet defines a second plurality of contiguous geometric features having peaks and valleys extending in a second rib direction, wherein the second plurality of contiguous geometric features define a total width to total height ratio W:H of about 1:1 to about 2.5:1, and
    wherein the second rib direction is different than the first rib direction.

2. The airfoil as in claim 1, wherein the airfoil is for a gas turbine engine.

3. The airfoil as in claim 1, wherein the maximum total height of the first plurality of contiguous geometric features is about 0.66 mm or less.

4. The airfoil as in claim 1, wherein the total width to total height ratio W:H of the first plurality of contiguous geometric features is about 1.25:1 to about 2.25:1.

5. The airfoil as in claim 1, wherein the first plurality of contiguous geometric features have a yaw angle β1 within about 45 degrees from a direction of a tangent line extending from the leading edge in the axial direction.

6. The airfoil as in claim 1, wherein the first plurality of contiguous geometric features have a yaw angle β1 within about 2 degrees to about 35 degrees from a direction of a tangent line extending from the leading edge in the axial direction.

7. The airfoil as in claim 1, wherein the first riblet array laminate and second riblet array laminate extend from the trailing edge to the leading edge to cover about 75% to about 99% of the airfoil surface in the axial direction A therebetween.

8. The airfoil as in claim 1, wherein the leading edge defines a substantially smooth surface, and wherein the second plurality of contiguous geometric features have a maximum total height of about 0.65 mm or less.

9. The airfoil as in claim 1, wherein the first riblet array sheet and the second riblet array sheet comprise an elastomeric material.

10. A gas turbine engine, comprising:
    a fan section comprising at least one fan blade, blisk, outlet guide vane, or any combination of one or more fan blade, blisk, and one or more outlet guide vane,
    a compressor,
    a combustor disposed downstream from the compressor, and
    a turbine disposed downstream from the combustor,
        wherein the engine comprises at least one airfoil defining a leading edge, a trailing edge, and an airfoil surface extending between the leading edge and the trailing edge, the airfoil comprising,
    a first riblet array laminate comprising,
        a first adhesive layer on at least a first portion of the airfoil surface,
        a first riblet array sheet disposed on at least a portion of the first adhesive layer, wherein the first riblet array sheet defines a first plurality of contiguous geometric features having peaks and valleys extending in a first rib direction, and wherein the first plurality of contiguous geometric features define a total width to total height ratio W:H of about 1:1 to about 2.5:1,
    a second riblet array laminate comprising,
        a second adhesive layer on at least a second portion of the airfoil surface,
        a second riblet array sheet disposed on at least a portion of the second adhesive layer, wherein the second riblet array sheet defines a second plurality of contiguous geometric features having peaks and valleys extending in a second rib direction, and wherein the second plurality of contiguous geometric features define a total width to total height ratio W:H of about 1:1 to about 2.5:1, and
    wherein the second rib direction is different than the first rib direction.

11. The engine as recited in claim 10, wherein the first riblet array laminate and second riblet array laminate exhibit a second erosion resistance that is greater than or equal to a first erosion resistance of the airfoil surface.

12. The engine as recited in claim 10, wherein the first plurality of contiguous geometric features and second plurality of contiguous geometric features comprise curved valleys.

13. The engine as recited in claim 10, wherein a peak angle α of the first plurality of contiguous geometric features and the second plurality of contiguous geometric features is about 75 degrees to about 105 degrees.

14. The engine as recited in claim 10, wherein the first plurality of contiguous geometric features and second plurality of contiguous geometric features is shaped in a sawtooth pattern.

15. The engine as recited in claim 10, wherein the first riblet array laminate and second riblet array laminate are disposed on at least one component in the fan section, and wherein the first plurality of contiguous geometric features define a total width to total height ratio W:H of about 1:1 to about 2.5:1 with a maximum total height of about 0.65 mm or less, and wherein the second plurality of contiguous geometric features define a total width to total height ratio W:H of about 1:1 to about 2.5:1 with a maximum total height of about 0.65 mm or less.

16. A method of providing erosion protection to an airfoil surface comprising the steps of:
    adhering a first riblet array laminate to the airfoil, the first riblet array laminate comprising a first adhesive layer on at least a first portion of the airfoil surface, and a first riblet array sheet disposed on at least a portion of the first adhesive layer, wherein the first riblet array sheet defines a first plurality of contiguous geometric features having peaks and valleys extending in a first rib direction, and wherein the first plurality of contiguous geometric features define a total width to total height ratio W:H of about 1:1 to about 2.5:1, and
    adhering a second riblet array laminate to the airfoil, the second riblet array laminate comprising a second adhesive layer on at least a second portion of the airfoil surface, and a second riblet array sheet disposed on at least a portion of the second adhesive layer, wherein the second riblet array sheet defines a second plurality of contiguous geometric features having peaks and valleys extending in a second rib direction that is different from the first rib direction, and wherein the second plurality of contiguous geometric features define a total width to total height ratio W:H of about 1:1 to about 2.5:1.

17. The method as recited in claim 16, wherein the first riblet array laminate and second riblet array laminate exhibit a second erosion resistance that is greater than or equal to a first erosion resistance of the airfoil surface.

18. The method as in claim 16, wherein the first riblet array sheet and second riblet array sheet comprise an elastomeric material.

19. The method as in claim 16, wherein a peak angle α of the first plurality of contiguous geometric features and the second plurality of contiguous geometric features is about 75 degrees to about 105 degrees, and wherein the first plurality of contiguous geometric features define a total width to total height ratio W:H of about 1:1 to about 2.5:1 with a maximum total height of about 0.65 mm or less, and wherein the second plurality of contiguous geometric features define a total width to total height ratio W:H of about 1:1 to about 2.5:1 with a maximum total height of about 0.65 mm or less.

* * * * *